United States Patent
Hyodo et al.

(10) Patent No.: US 7,956,796 B2
(45) Date of Patent: Jun. 7, 2011

(54) DETECTING DEVICE AND RAILROAD VEHICLE

(75) Inventors: Akihiko Hyodo, Hino (JP); Shigeru Oho, Tokyo (JP); Naoki Kato, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/453,304

(22) Filed: May 6, 2009

(65) Prior Publication Data

US 2010/0026562 A1   Feb. 4, 2010

(30) Foreign Application Priority Data

Aug. 1, 2008   (JP) .................................. 2008-199398

(51) Int. Cl.
  *G01S 13/74*   (2006.01)
  *G01S 13/06*   (2006.01)
  *G01S 13/00*   (2006.01)

(52) U.S. Cl. ................ 342/46; 342/27; 342/42; 342/43; 342/118; 342/125; 342/175; 342/195

(58) Field of Classification Search ................ 342/1–11, 342/27–51, 61–65, 70–72, 118, 125, 175, 342/195, 450–465; 180/167–169
See application file for complete search history.

(56) References Cited

U.S. PATENT DOCUMENTS

| | | | | |
|---|---|---|---|---|
| 2,441,956 A | * | 5/1948 | Labin et al. | 342/125 |
| 3,247,508 A | * | 4/1966 | Bradford et al. | 342/44 |
| 3,247,509 A | * | 4/1966 | Hamann et al. | 342/44 |
| 3,247,510 A | * | 4/1966 | Molnar et al. | 342/44 |
| 3,247,514 A | * | 4/1966 | Hamann et al. | 342/44 |
| 3,311,915 A | * | 3/1967 | Mori | 342/44 |
| 3,366,952 A | * | 1/1968 | Mori | 342/44 |
| 3,426,349 A | * | 2/1969 | Gareis | 342/51 |
| 3,467,962 A | * | 9/1969 | Laplume | 342/44 |
| 3,691,557 A | * | 9/1972 | Constant et al. | 342/44 |
| 3,716,855 A | * | 2/1973 | Asam | 342/33 |
| 3,757,290 A | * | 9/1973 | Ross et al. | 342/457 |
| 3,810,179 A | * | 5/1974 | Merrick | 342/46 |
| 3,959,792 A | * | 5/1976 | Hildebrandt | 342/44 |
| 3,981,011 A | * | 9/1976 | Bell, III | 342/44 |
| 4,027,840 A | * | 6/1977 | Blair | 342/42 |
| 4,069,888 A | * | 1/1978 | Wolters et al. | 180/169 |
| 4,278,142 A | * | 7/1981 | Kono | 180/168 |
| 4,811,228 A | * | 3/1989 | Hyyppa | 180/169 |
| 4,912,471 A | * | 3/1990 | Tyburski et al. | 342/44 |
| 5,332,180 A | * | 7/1994 | Peterson et al. | 342/456 |
| 5,684,489 A | * | 11/1997 | Fournier | 342/22 |

* cited by examiner

*Primary Examiner* — Bernarr E Gregory
(74) *Attorney, Agent, or Firm* — Stites & Harbison PLLC; Juan Carlos A. Marquez, Esq.

(57) ABSTRACT

A system according to the invention detects location information of a vehicle by using a reflection strength change of an electromagnetic wave. The system incorporates a radiowave transmitter which emits a first radiowave, positional markers which generate unique reflection strengths and patterns of temporal changes in the reflection strength from the emitted first radiowave at respective absolute positions, a radiowave receiver which receives a second radiowave reflected by the positional marker and converts the second radiowave into a signal format for extracting location information to output the same, and a marker recognition device which obtains a location of the vehicle from the output of the radiowave receiver. Accordingly, a highly-precise location specification with a resolution smaller than or equal to 1 cm and a highly-reliable location specification which is not affected by slip and slide of the vehicle's wheels can be realized.

19 Claims, 8 Drawing Sheets

| Count | Dist |
|-------|------|
| 1 | 8 |
| 2 | 4 |
| 3 | 2 |
| : | : |

← LTB

| LID | ST | LOC |
|---|---|---|
| : | : | : |
| 1342 | ST1 | LOC1 |
| 1343 | ST2 | LOC2 |
| : | : | : |

← LTB

DETECTING DEVICE AND RAILROAD VEHICLE

CROSS-REFERENCE TO RELATED APPLICATION

The present application claims priority from Japanese Patent Application No. JP 2008-199398 filed on Aug. 1, 2008, the content of which is hereby incorporated by reference into this application.

TECHNICAL FIELD OF THE INVENTION

The present invention relates to a detecting device and a railroad vehicle, more particularly, a technique for detecting location information of vehicles such as railroad vehicles and elevators.

BACKGROUND OF THE INVENTION

Techniques on which the inventors of the present invention have studied include the following techniques for detecting location information of vehicles.

For example, in the railroad transportation field, it is desired to develop a new railroad system to save labor and equipment cost. An indispensable thing to realize that is a sensor technology for each railroad vehicle to recognize its location and speed highly precisely while running. Conceivable methods to detect location of each railroad vehicle include a method of detecting by a ground system and a method of detecting by a railroad vehicle system. In the current system, location detection is generally done by ground systems. Since the method using a ground system requires equipment cost and maintenance cost a lot, it has been desired to have a system for detecting locations on the railroad vehicle side.

SUMMARY OF THE INVENTION

Current railroad location management generally uses transponders. Transponder is installed at an arbitrary point on a railway and performs information transmission between the ground and vehicles. A known location determination method is such that the transponder sends its uniquely-given ID (identification information) and vehicles memorizes IDs of respective transponders and its absolute position corresponding to the transponders to determine its location from the ID upon passing by the transponder.

Meanwhile, since the method using transponders requires a lot of costs and maintenance, it is difficult to provide a large number of transponders. In addition, since the transponder cannot always detect locations of railroad vehicles on its own, it is necessarily led to perform location detections continuously by combining with relative position detecting devices. Currently, relative positions are assumed by detecting the number of wheel rotations with using a tachogenerator, and this method has a problem of an error of several meters upon slip and slide. Therefore, the situation is incapable of reducing the number of expensive transponders.

Accordingly, an object of the present invention is to provide a technique capable of detecting location information of vehicles at low cost.

The above and other objects and novel characteristics of the present invention will be apparent from the description of the present specification and the accompanying drawings.

The typical ones of the inventions disclosed in the present application will be briefly described as follows.

That is, a detecting device according to a typical embodiment is a device mounted on a vehicle such as a railroad vehicle and an elevator cage and detecting location information of the vehicle. And, the detecting device includes: a radiowave transmitter emitting a first radiowave; a radiowave receiver receiving a second radiowave that is a radiowave formed by the first radiowave hit against an object and reflected by the object; and a recognition device for detecting location information of a vehicle based on a changing pattern of intensities of the second radiowave.

In addition, a railroad vehicle according to a typical embodiment is a railroad vehicle mounting the above detecting device.

The effects obtained by typical aspects of the present invention will be briefly described below. According to typical embodiments, location information of vehicles can be detected at low cost.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that, components having the same function are denoted by the same reference symbols throughout the drawings for describing the embodiment, and the repetitive description thereof will be omitted. In addition, unless otherwise stated, a symbol denoting a name of a terminal also denotes a name of a wiring and a signal at the same time, and also denotes a voltage value in the case of a power source.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

First Embodiment

While the present invention provides location specifying means for any vehicles, as for railroad vehicles, for example, it is effective to train automatic stop control. Accordingly, embodiments of the present invention for train automatic stop control will be described hereinafter.

Figure 1:
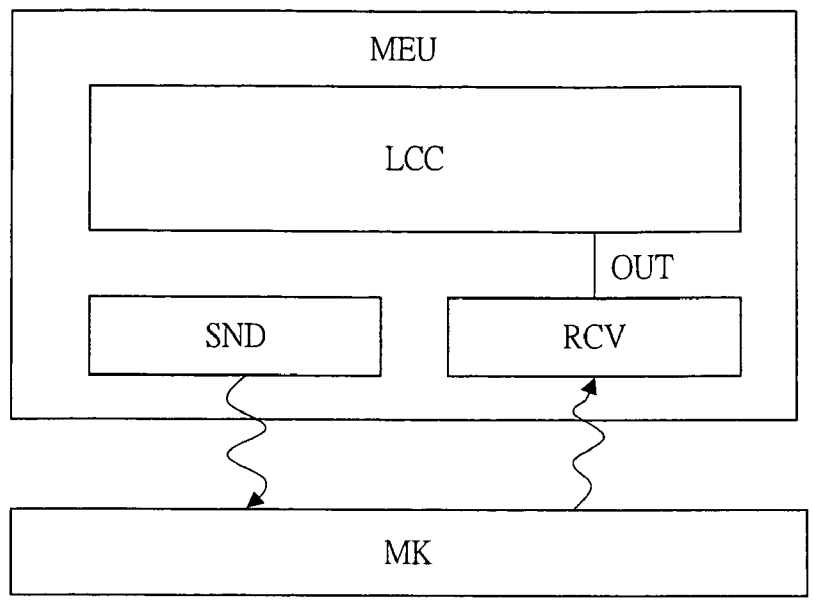
FIG. 1 is a block diagram showing a configuration example of a vehicle location specifying system according to a first embodiment of the present invention.
Figure 2:
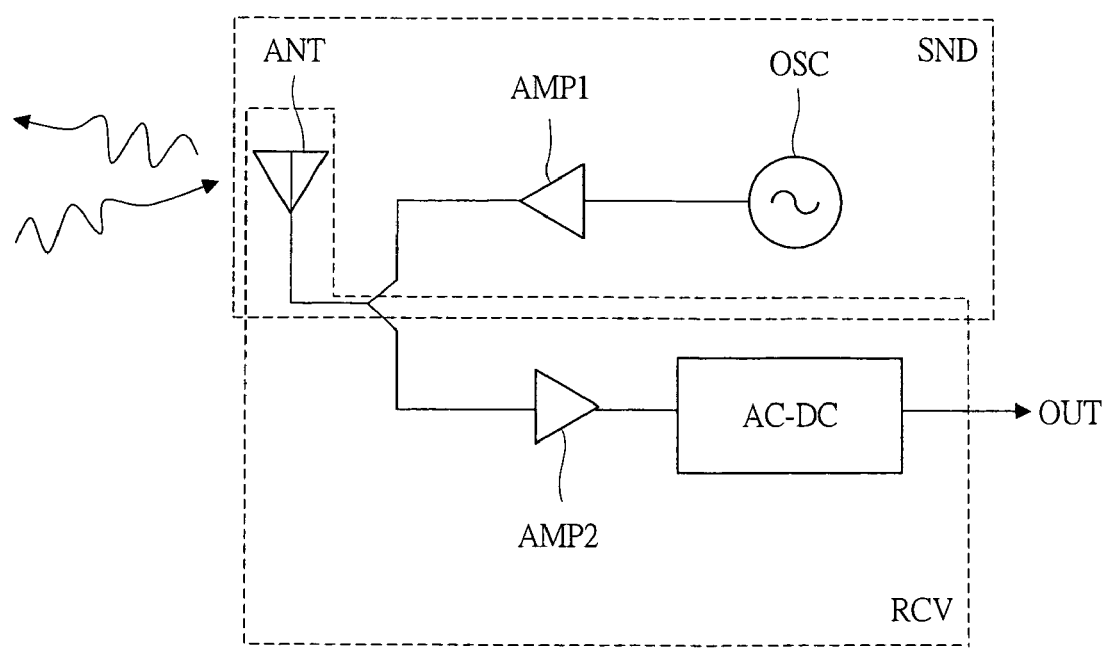
FIG. 2 is a block diagram showing a configuration example of a radiowave transmitter and a radiowave receiver in the vehicle location specifying system according to the first embodiment of the present invention.
Figure 3:
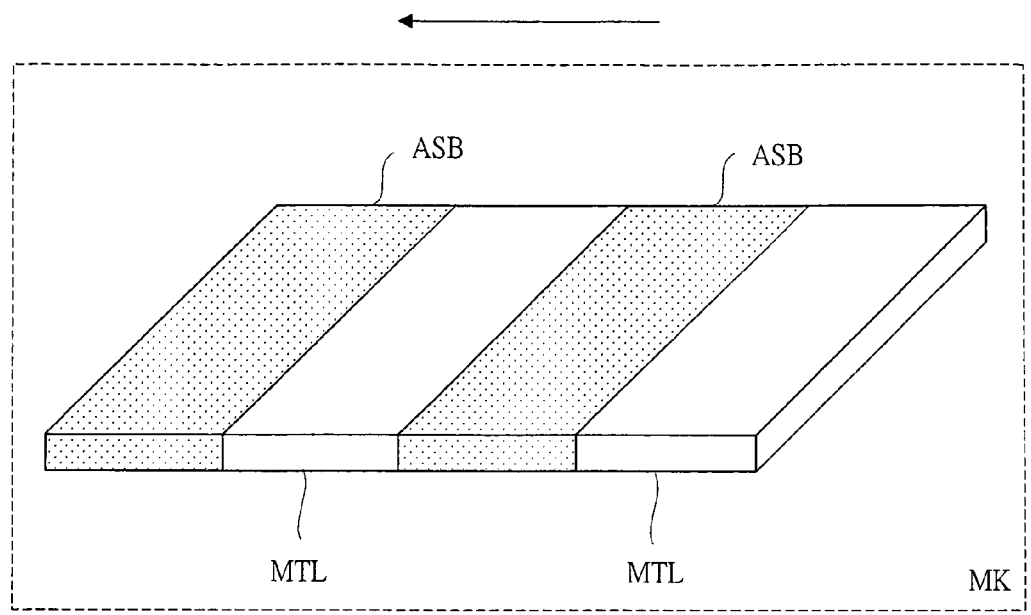
FIG. 3 is a perspective view showing a configuration example of a positional marker in which a radiowave reflecting material and a radiowave absorbent material are combined.
Figure 4:
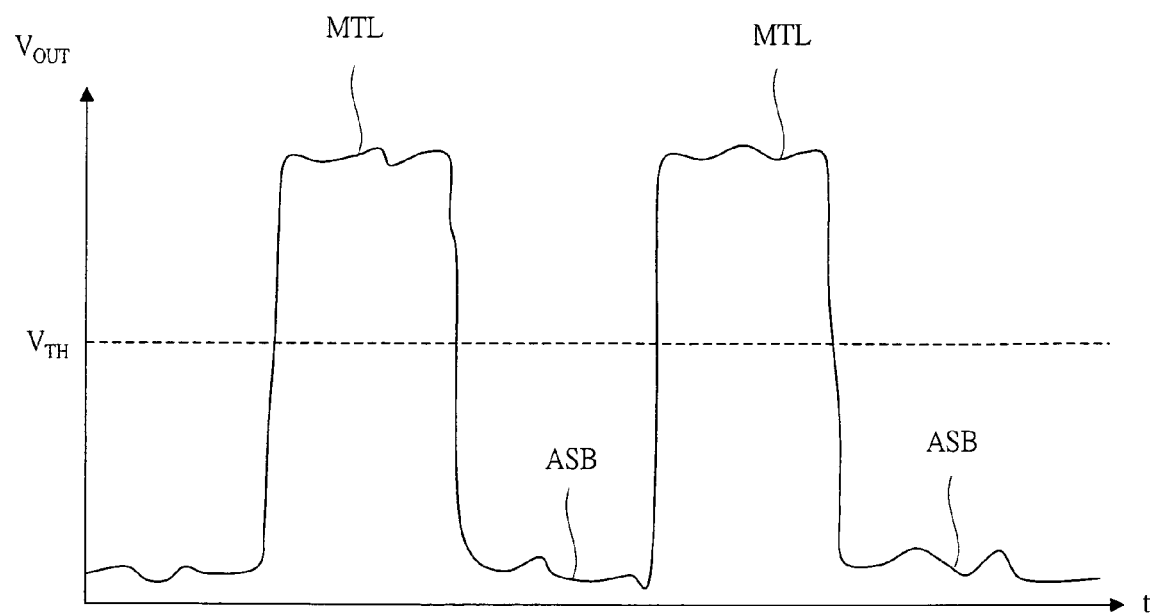
FIG. 4 is a diagram showing a change in radiowave reflection strength of the positional marker in FIG. 3.

FIG. 1 is a block diagram showing a configuration example of a vehicle location specifying system according to a first embodiment of the present invention, FIG. 2 is a block diagram showing a configuration example of a radiowave transmitter and a radiowave receiver in the vehicle location specifying system according to the first embodiment, FIG. 3 is a perspective view showing a positional marker in which a radiowave reflective material and a radiowave absorbent material are combined, and FIG. 4 is a diagram showing a change in radiowave reflection strength of the positional marker in FIG. 3.

First, with reference to FIG. 1, an example of a configuration of the vehicle location specifying system according to the first embodiment will be described. The vehicle location specifying system of the first embodiment is configured by a vehicle location detecting device MEU which detects location information of a vehicle, a positional marker MK, etc. The vehicle location detecting device MEU is configured by, for example, a radiowave transmitter SND, a radiowave receiver RCV, a marker recognition device LCC, etc.

The radiowave transmitter SND generates a radiowave (first radiowave) of a desired frequency and emits the same. The positional marker MK reflects the radiowave emitted from the radiowave transmitter SND by a position-specific reflection strength or reflection strength change. The radiowave receiver RCV receives the radiowave (second radiowave) reflected by the positional marker MK and converts the received signal to a DC (Direct Current) signal. The marker recognition device LCC discretizes the DC signal converted by the radiowave receiver RCV and refers to a location information table indicating an installation position of the positional marker MK with indexing by a data stream obtained from a reflection strength change pattern, thereby specifying the current location. Alternatively, the marker recognition device LCC counts, in a situation where the reflection strength reaches a specific signal level in a constant cycle, the number of times the reflection strength reaches the specific signal level, and refers to the location information table with indexing by the counted number, thereby specifying the current location. In addition, there is also a method for specifying the current location, in which, by simply taking the reflection strength changes of the positional marker as a repeat of strong and weak, the number of changes of the signal from being weak to strong is counted.

In the vehicle location specifying system of the first embodiment, the vehicle location detecting device MEU including the radiowave transmitter SND, the radiowave receiver RCV, and the marker recognition device LCC is attached to the vehicle, and the positional marker MK for creating unique reflection strength changes by combining a radiowave reflecting material and a radiowave absorbent material is installed. The positional markers MK are arranged along a track of the railroad vehicle. More specifically, the positional marker MK is fixed on a railway or a side wall of a platform in a station. The vehicle location detecting device MEU is installed on a bottom surface or a side wall of the railroad vehicle suitably according to installation location of the positional marker MK.

Note that, as for the installation location of the positional marker MK, it is considered that a side wall of a platform in a station is suitable if possible, and it is because factors of reflection other than targeted ones are limited than the ground, and it is adjacent to a position where the railroad vehicle stops at the station. The positional markers MK are installed along a side wall from a starting point of a stopping operation to a stopping place.

Here, the used radiowave is in a millimeter wave band that is capable of achieving a position resolution more precise or smaller than or equal to one centimeter and excellent in environment resistance.

Configurations of the radiowave transmitter SND and the radiowave receiver RCV are shown in FIG. 2. The radiowave transmitter SND has, for example, an oscillator generating millimeter wave frequency signal such as 76 GHz, an amplifier AMP1 amplifying an output signal of the oscillator OSC, and an antenna ANT for emitting millimeter wave frequency signals. On the other hand, the radiowave receiver RCV has the antenna ANT (shared by the radiowave transmitter SND and the radiowave receiver RCV) for receiving a radiowave, an amplifier AMP2 amplifying an amplitude of the receiving signal, a rectifier and smoothing circuit AC-DC, etc. The received signal amplified by the amplifier AMP2 is converted to a DC signal through the rectifier and smoothing circuit AC-DC so that an output signal OUT is outputted. Note that, in FIG. 2, while the antenna ANT is shared by the radiowave transmitter SND and the radiowave receiver RCV, different antennas may be respectively provided.

The positional marker MK reflects the emitted radiowave from the radiowave transmitter SND with a reflection strength change unique to its installation position. There are some conceivable methods to create such a unique reflection strength change. One of them is a method which combines the radiowave reflecting material and the radiowave absorbent material alternately and it is defined that a signal strength upon passing through the radiowave reflecting material is determined as 1, and a signal strength upon passing over the radiowave absorbent material is determined as 0, so that a reflection strength change is created. This method is advantageous in noise resistance. Other than that, a conceivable method is such that a reflection strength change is created according to a combination of different materials, and a combination of different shapes such as different reflection areas and different reflection distances.

According to the above-described means, the signals having the unique reflection strength change reflected by the positional marker MK are fetched into the radiowave receiver RCV and converted to a DC signal, and then transmitted to the marker recognition device LCC. The marker recognition device LCC classifies the output signal OUT of the radiowave receiver RCV into a several steps of grayscales by using an A/D converter.

FIG. 3 shows an example of alternately combining a radiowave reflecting material MTL and a radiowave absorbent material ASB. When a vehicle (railroad vehicle etc.) mounting the vehicle location detecting device MEU passes over the positional marker MK in FIG. 3 from right to left with emitting radiowaves, the strength of the reflected signal is changed as strong, weak, strong, weak, . . . . Shown in FIG. 4 is a temporal change of a voltage $V_{OUT}$ of the output signal OUT of the radiowave receiver RCV. Note that, in FIG. 4, the vertical axis indicates the voltage $V_{OUT}$, and the horizontal axis indicates time "t". The reflection strength change can be discretized with taking a threshold voltage $V_{TH}$ as a reference. Note that, in a situation where there is no reflective matter to be noise is present other than the positional marker MK, it is not particularly necessary to embed the reflection absorbing material, and it is sufficient when installing only the reflective material.

Second Embodiment

Figure 5:
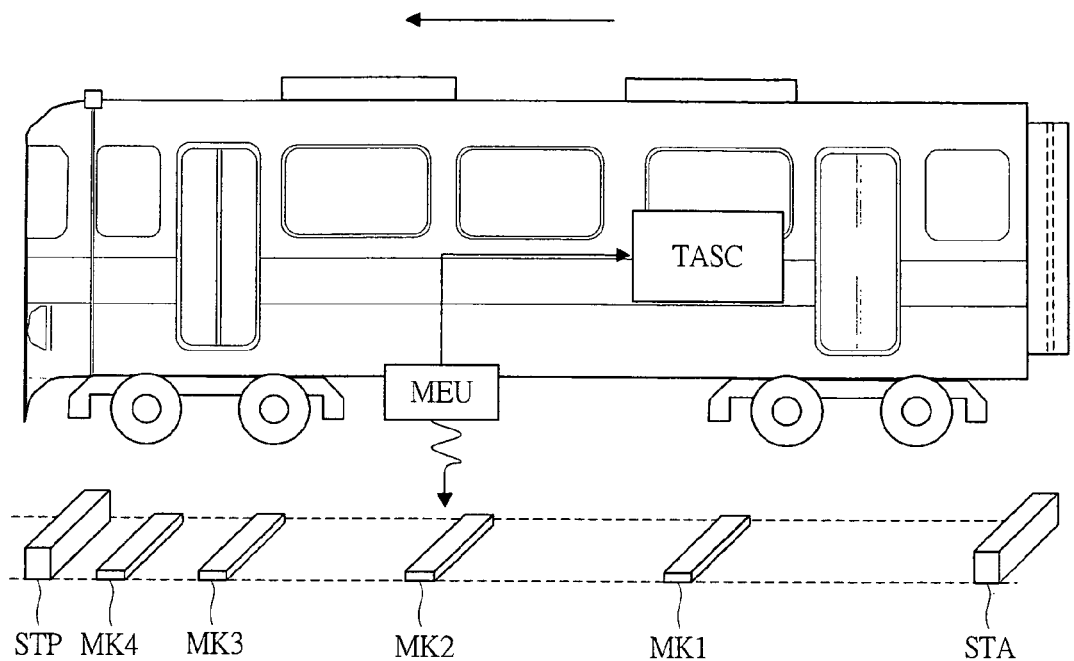
FIG. 5 is a schematic diagram showing a configuration example of a vehicle location specifying system according to a second embodiment of the present invention.
Figure 6:
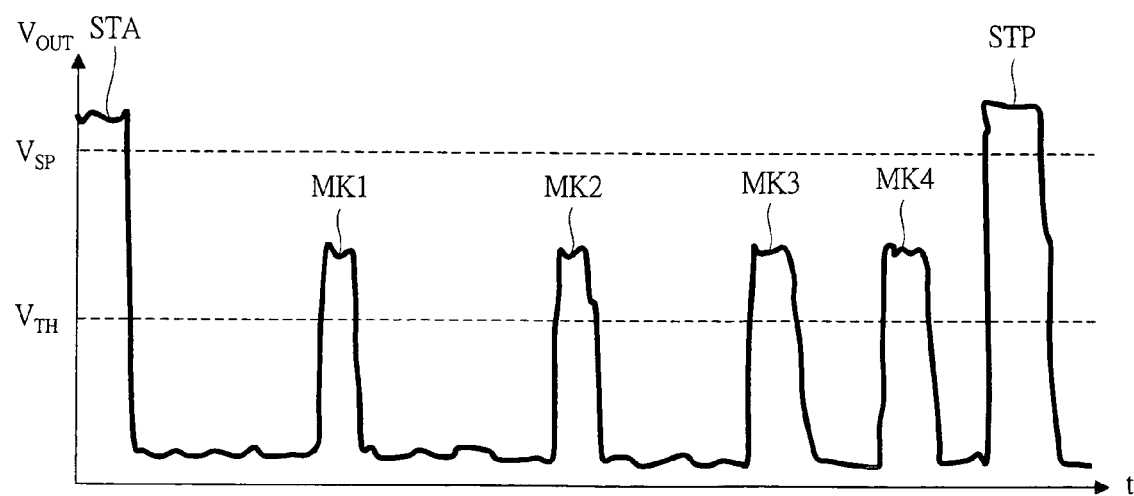
FIG. 6 is a diagram showing voltage changes of an output signal of a radiowave receiver in the vehicle location specifying system according to the second embodiment of the present invention.
Figure 7:
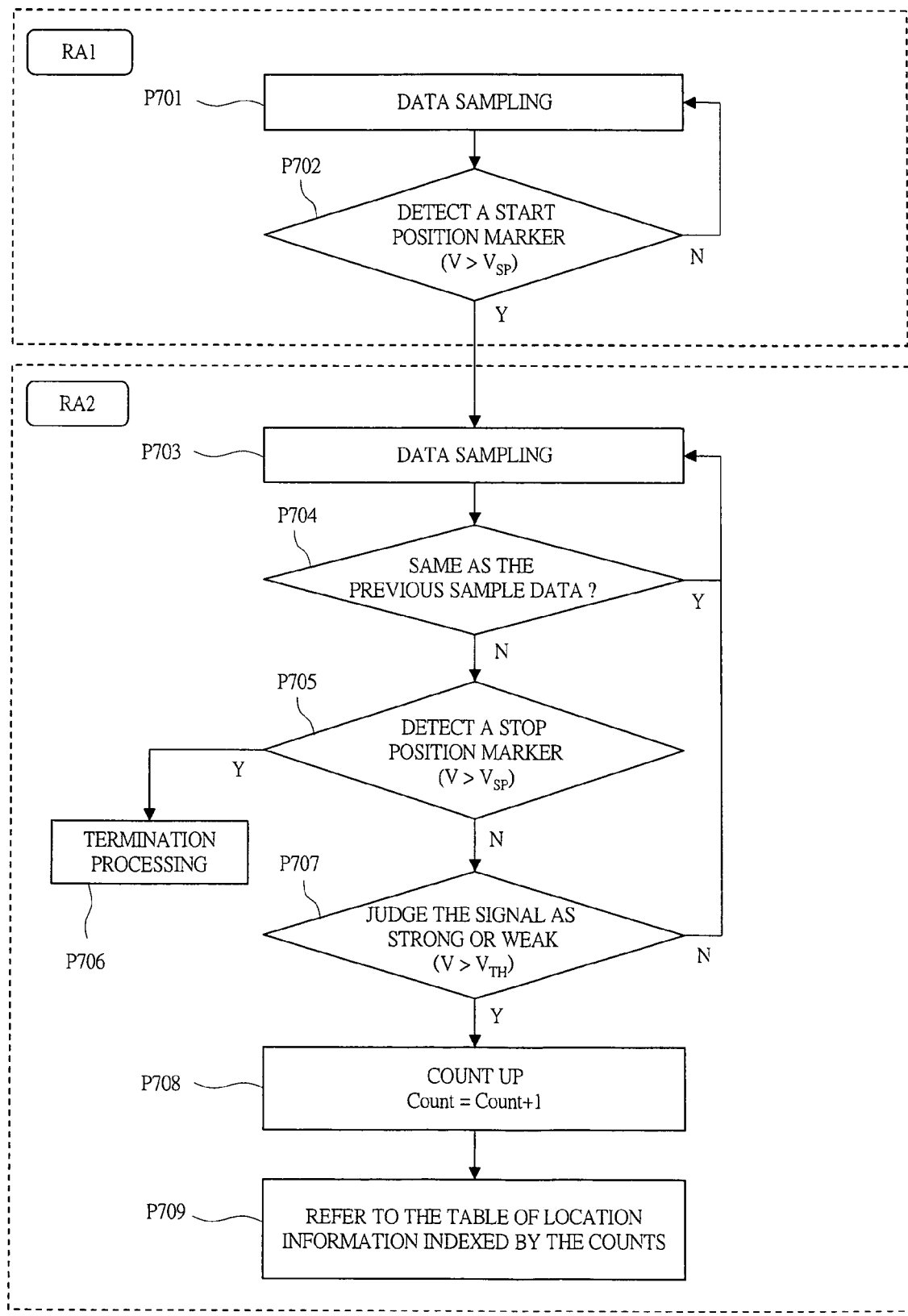
FIG. 7 is a flowchart showing a processing procedure of a marker recognition device according to the second embodiment of the present invention.
Figures 8, 9:
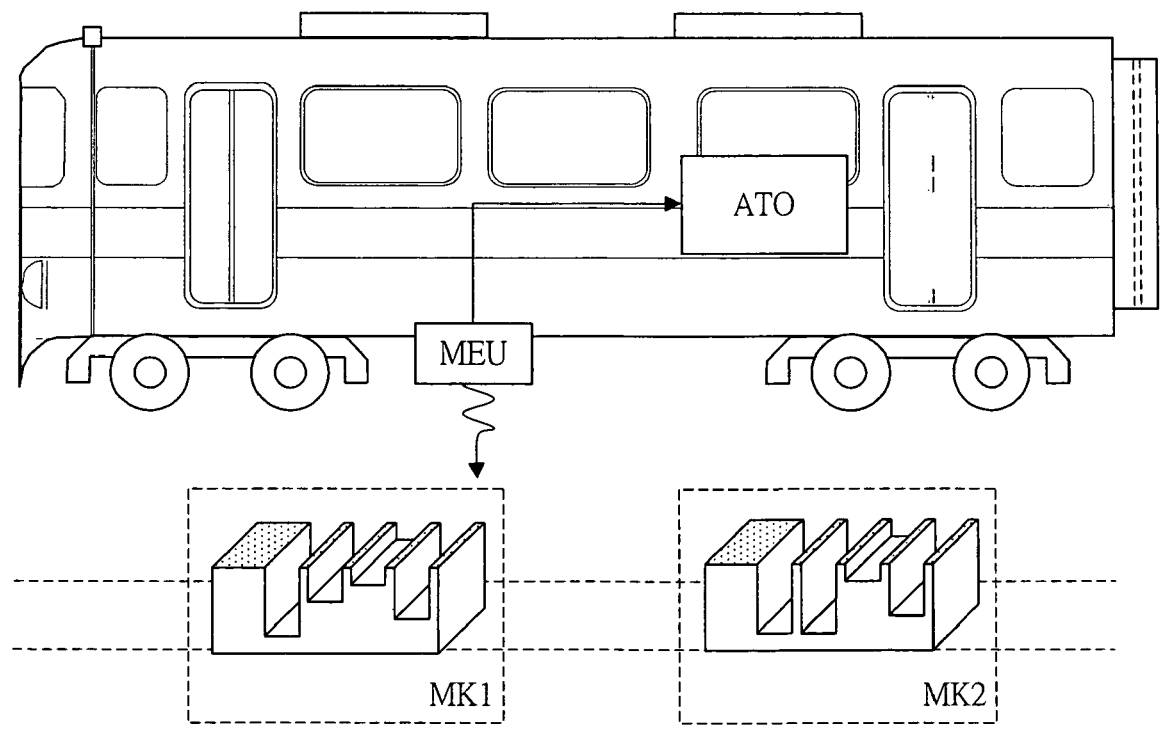
FIG. 8 is a diagram showing a configuration example of a location information table according to the second embodiment of the present invention.
FIG. 9 is a schematic diagram showing a configuration example of a vehicle location specifying system according to a third embodiment of the present invention.

FIG. 5 is a schematic diagram showing a configuration example of a vehicle location specifying system according to a second embodiment, FIG. 6 is a diagram showing a voltage change of an output signal OUT of a radiowave receiver RCV in the vehicle location specifying system according to the second embodiment, FIG. 7 is a flowchart showing a processing procedure of a marker recognition device LCC, and FIG. 8 is a diagram showing a configuration example of a position information table LTB.

Shown in FIG. 5 is an installation state of a position specifying system in the case of applying the present invention to train automatic stop control of railroad vehicle. The vehicle location specifying system of the second embodiment is configured by a train automatic stop control TASC, a vehicle location detecting device MEU, positional markers MK1 to MK4, STA, and STP, etc. The train automatic stop control TASC and the vehicle location detecting device MEU are mounted on the railroad vehicle. The vehicle location detecting device MEU is same with the vehicle location detecting device MEU of the first embodiment. The positional markers MK1 to MK4, STA, and STP are formed of a radiowave reflective material. Ballasts are provided between the positional markers MK1 to MK4, STA, and STP to serve as a radiowave absorbent material.

The positional marker STA is installed at a starting point of stopping control, and the positional marker STP is installed at a stopping position of the railroad vehicle, respectively, and other positional markers MK1 to MK4 indicating points on the way between the starting point and the stopping point are installed at a different height from the positional markers STA and STP. In this manner, the marker recognition device can recognize reference points for specifying locations. Note that, while the positional markers are illustrated in an enlarged manner in FIG. 5, in practice, the positional markers are very small as compared with the railroad vehicle, for example, it can be sufficiently recognized when having several millimeters in width in the traveling direction of the railroad vehicle. A positional marker having this size will not fail to detect when setting a data sampling rate of reflected radiowave to several tens of MHz or higher that is sufficiently realizable in existing microcomputers, etc.

The positional markers in FIG. 5 is formed of one type of reflecting material and obtains a change in reflection strength (voltage $V_{OUT}$ of the output signal OUT of the radiowave receiver RCV) shown in FIG. 6 when the positional marker reflects radiowave emitted from the travelling railroad vehicle. Note that, in FIG. 6, the vertical axis indicates the voltage $V_{OUT}$, and the horizontal axis indicates time "t". The voltage $V_{OUT}$ indicating a reflection strength is compared with a threshold voltage $V_{SP}$ in FIG. 6 having been set to specify the type of positional marker previously and a threshold voltage $V_{TH}$, and classified according to the reflection strength, so that the marker recognition device can recognize each positional marker. The specified location information is sent from the vehicle location detecting device MEU to the train automatic stop control TASC as shown in FIG. 5.

Note that, in the example described in FIG. 5 and FIG. 6, distances between the respective positional markers are not equal so that it becomes narrower as being closer to the stopping position. This is because requirements on the positional precision are different between the time of starting stopping operation and the time immediately before stopping so that the present method can enable an improvement in position detection precision with suppressing installation cost.

Next, a procedure of a position specifying processing of the marker recognition device LCC will be described with reference to FIG. 7. The processing procedure is divided into a processing RA1 for detecting a stopping control start position marker STA and a processing RA2 for obtaining a remaining distance by detecting respective positional markers until the stop position marker STP. The respective processings are stored in a memory inside a microcomputer as a program to be processed by a CPU.

First, the processing RA1 will be described. The marker recognition device LCC samples the output signal OUT of the radiowave receiver RCV at a constant cycle (step P701). A sampling rate thereof is necessary to be sufficiently high with respect to a signal change. Next, a sampled voltage value "V" and the threshold voltage $V_{SP}$ for identifying the stopping control start position marker STA are compared (step P702). When the voltage value V is larger than the threshold voltage $V_{SP}$, i.e., when the stopping control start position marker STA is detected, the procedure advances to the processing RA2. Here, the determination (step P702) may not be performed by only one sampling, and the voltage value V being larger than $V_{SP}$ may be determined by continuously comparing through a plurality of data sampling periods. The processing RA1 is repeated until detecting the stopping control start position marker STA.

Next, the processing RA2 will be described. The marker recognition device LCC samples the output signal OUT of the radiowave receiver RCV at a constant cycle (step P703), and compares a sampled voltage value V with the previous sampled voltage value V (step P704). When the sampled voltage value V is same with the previous one, the process returns to the previous process (step P703), and when the sampled voltage value V is different from the previous one, the samples voltage value V is compared with the threshold voltage $V_{SP}$ for identifying the stop position marker STP (step P705). Then, when the sampled voltage value V is larger than the threshold voltage $V_{SP}$, i.e., when the stop position marker STP is detected and an arrival to the stopping position is recognized, the marker recognition device LCC transmits the arrival to the train automatic stop control TASC, then terminates the position specifying processing (step P706). When the sampled voltage value V is smaller than the threshold voltage $V_{SP}$, this time, the threshold voltage $V_{TH}$ capable of identifying the positional markers MK1 to MK4 and the sampled voltage value V are compared (step P707). Then, when the sampled voltage value V is larger than the threshold voltage $V_{TH}$, i.e., any of the positional markers MK1 to MK4 is detected, the number of counts (Count) of the detected positional marker is counted up (+1) (step P708). Based on the number of counts, a location information table (LTB) is referred (step P709), and a remaining distance (Dist) to the stopping position is obtained and transmitted to the train automatic stop control TASC.

Consequently, according to the second embodiment, it becomes possible to detect the distance to the stopping position with an error smaller than or equal to 1 cm, so that an improvement in a precision of the train automatic stop control with low cost and high reliability can be realized.

Third Embodiment

The first and second embodiments described above are configuration examples regarding a position specifying method mainly relating to stopping operation, where positions are specified by counting the number of signal risings, basically.

In a third embodiment, an embodiment regarding control for following defined travelling patterns such as an automatic operation of railroad vehicle and traffic control between stations will be described.

Figure 11:
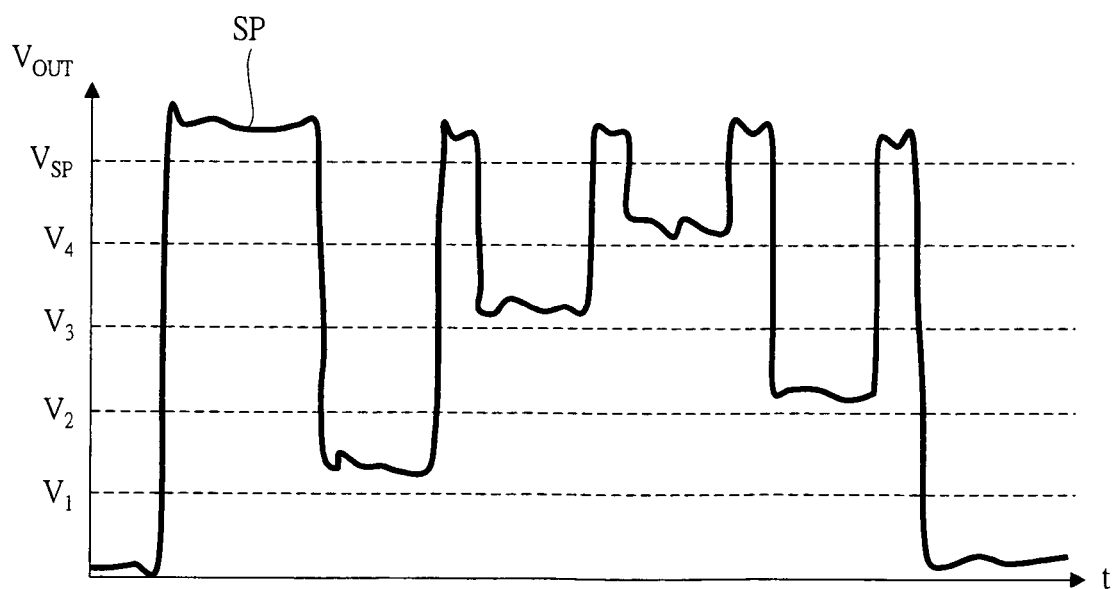
FIG. 11 is a diagram showing voltage changes of an output signal of a radiowave receiver in the vehicle location specifying system according to the third embodiment of the present invention.
Figure 11:
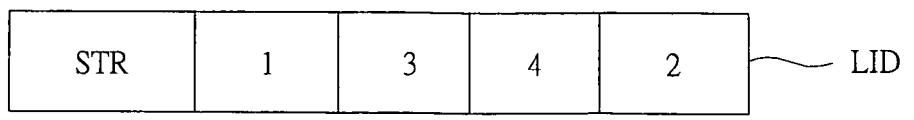
Figure 12:
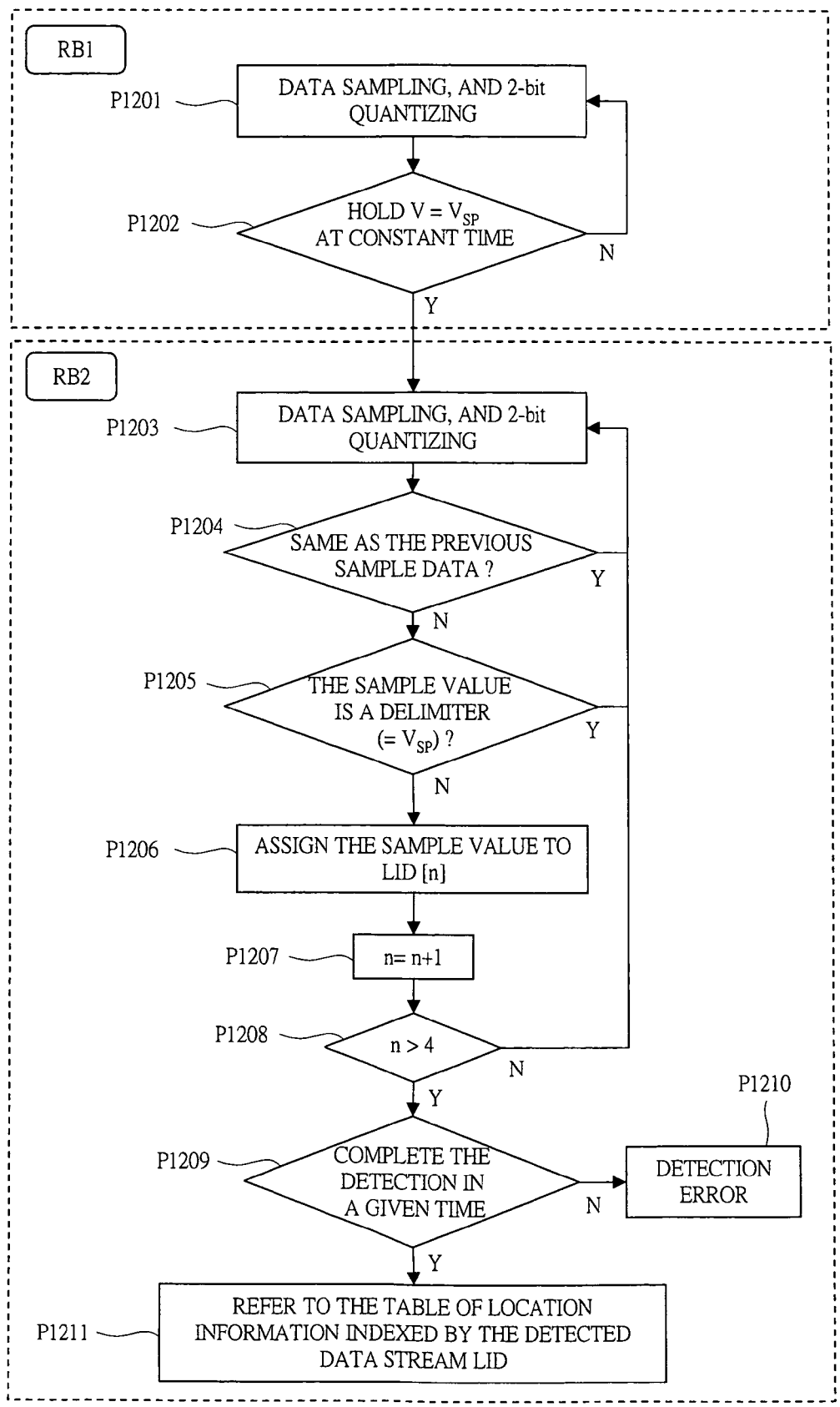
FIG. 12 is a flowchart showing a processing procedure of a marker recognition device according to the third embodiment of the present invention.
Figures 13, 14:
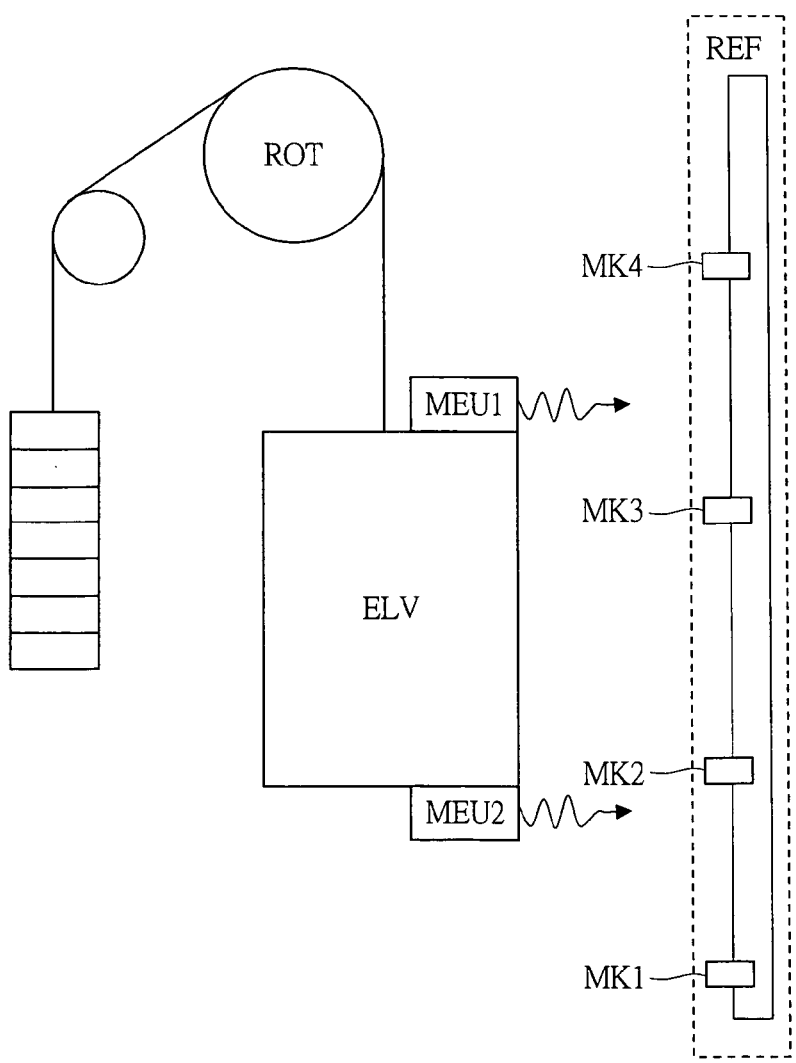
FIG. 13 is a diagram showing a configuration example of a location information table according to the third embodiment of the present invention.
FIG. 14 is a schematic diagram showing a configuration example of a vehicle location specifying system according to a fourth embodiment of the present invention.

FIG. 9 is a schematic diagram showing a configuration example of a vehicle location specifying system of the third embodiment, FIG. 9 is a perspective view showing a configuration example of a positional marker MK in the vehicle location specifying system of the third embodiment, FIG. 11 is a diagram showing a voltage change of an output signal OUT of a radiowave receiver RCV, FIG. 12 is a flowchart showing a processing procedure of a marker recognition device LCC, and FIG. 13 is a diagram showing a configuration example of a location information table LTB.

FIG. 9 shows an installation state of a location specifying system in the case where the present invention is applied to an automatic operation control of railroad vehicles. The vehicle location detecting device of the third embodiment is configured by an automatic train operation ATO, a vehicle location detecting device MEU, positional markers MK1, MK2, etc. The automatic train operation ATO and the vehicle location detecting device MEU are mounted on a railroad vehicle. The vehicle location detecting device MEU is the same one with the vehicle location detecting device MEU according to the first and second embodiments.

The positional markers MK1 and MK2 respectively indicate positional markers installed at an arbitral distance interval, and have respectively unique reflection strength changes. The vehicle location detecting device MEU attached to the vehicle (railroad vehicle) side detects these positional markers and transmits the position information specified here to the automatic train operation ATO.

Figure 10:
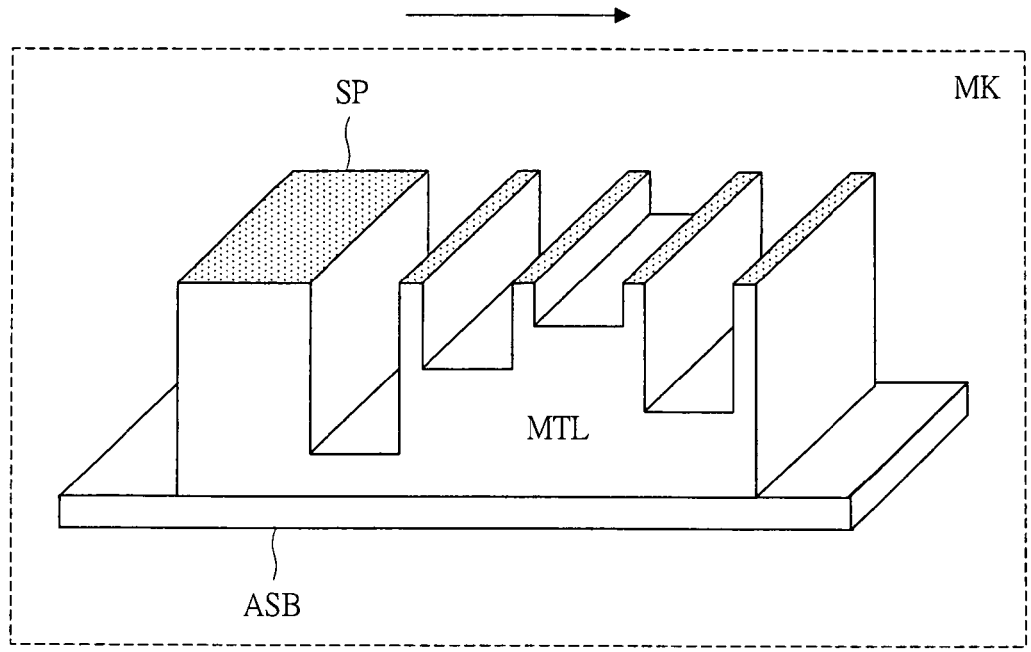
FIG. 10 is a perspective view showing a configuration example of a positional marker according to a vehicle location specifying system according to the third embodiment of the present invention.

FIG. 10 shows a configuration example of positional markers MK (corresponding to the positional markers MK1 and MK2) having quaternary information of 4 tones (2 bit) to be used in the third embodiment. FIG. 11 shows a change of reflection strength (voltage $V_{OUT}$ of the output signal OUT of the radiowave receiver RCV) of the positional markers MK. Note that, in FIG. 11, the vertical axis indicates the voltage $V_{OUT}$, and the horizontal axis indicates time "t".

As shown in FIG. 10, the positional marker MK is configured by two reflecting parts, where one of them is a reflecting plane (SP) made to keep a strong reflection strength for a specific period so that the marker recognition device LCC can recognize a starting point of the positional marker, and the other one is a reflecting plane to which quaternary reflection intensities of 4 tones (threshold voltages $V_1$, $V_2$, $V_3$, $V_4$ in FIG. 11) are set by providing differences in height to the reflecting planes. Note that, to clarify sections, reflecting planes having strong reflection intensities are inserted between respective reflecting planes indicating four variables.

In the example of the positional marker in FIG. 11, the marker recognition device LCC performs discretizing of the voltage $V_{OUT}$ indicating the reflection strength for detecting a location ID (LID) including a positional marker starting signal (STR) and 4 variables 1, 3, 4, and 2.

More specifically, the marker recognition device LCC separates the output signal OUT of the radiowave receiver RCV into several steps of tones using an A/D converter. The number of recognizable tones is determined its limit according to a level of noise due to a variation in reflection strength and ambient environment, and it is a realizable range until about 4 tones. Here, for example, in the case where 4 variables of 4 tones are determined as one positional marker, 256 points can be recognized. This is calculated that location can be specified by a distance interval shorter than or equal to 150 m when exemplifying the Yamanote Line in Tokyo, Japan.

Next, with reference to FIG. 12, a procedure of a location specifying processing of the marker recognition device LCC will be described. The processing procedure is sectioned into a processing RB1 for detecting existence of the positional marker, and a processing RB2 for detecting location information unique to the positional marker's reflection strength change to obtain location information. Respective processings are stored as a program into a memory in a microcomputer and processed by a CPU.

First, the processing RB1 will be described. The marker recognition device LCC samples the output signal OUT of the radiowave receiver RCV at a constant cycle, and converts the same into 2-bit discrete value by, for example, an A/D converter (step P1201). Then, it is determined whether the obtained sampled voltage value V is maintained its signal level $V_{SP}$ for a specific period continuously or not (step P1202). When it is true, i.e., a signal indicating a starting position of the positional marker is detected, the procedure advances to the processing RB2. When it is false, the processing RB1 is repeated.

Next, the processing RB2 will be described. The marker recognition device LCC samples the output signal OUT of the radiowave receiver RCV at a constant cycle, and converts the same into 2-bit discrete data by an A/D converter and the like (step P1203). When a sampled value here is same with the previous sampled value, the procedure returns to the previous processing (step P1203). When the sampled value here is different from the previous sampled value, next, the sampled voltage value V and the threshold voltage $V_{SP}$ at a sectioning part between variables are compared (steps P1204 and P1205). When the sampled voltage value V and the threshold voltage $V_{SP}$ are same, that is, the samples voltage value V is at the sectioning part between variables, the procedure returns to the previous processing (step P1203). When the sampled voltage value V and the threshold voltage $V_{SP}$ are not coincide with each other, the sampled voltage value V is taken as available variable data and stored as an n-th variable in an array LID (step P1206). Note that, an initial value of "n" is 0, and it is counted up (+1) when a variable is added to the array step (step P1207). The above processings (steps P1203 to 1206) are repeated until the "n" exceeds 4. Then, when all of the 4 variables are stored, it is determined whether all of the 4 variable data is stored within a specified time or not (step P1209). When the specified time is exceeded, a detection error signal is transmitted to the automatic train operation ATO (step P1210). This is because there may be a possibility of detecting variables across two positional markers due to incomplete detection, erroneous detection, etc. When the detection is finished within the specified time, a location information table (LTB) shown in FIG. 13 is referred (step P1211) and detected a variable data stream LID and a registered LID are checked, thereby obtaining location information. Here, in the location information table (LTB), informations such as the next station (ST) to arrive, an absolute location (LOC), etc. are contained. The marker recognition device LCC transmits the location information to the automatic train operation ATO.

Therefore, according to the third embodiment, in addition to a high location precision, a configuration very inexpensive and easy to maintenance as compared with the current location management system configured by a tachogenerator and a transponder can be realized.

Fourth Embodiment

FIG. 14 is a schematic diagram showing a configuration example of a vehicle location specifying system according to a fourth embodiment of the present invention.

FIG. 14 shoes an installation state of a location specifying system in the case where the present invention is applied to an automatic operation control of railroad vehicles. The vehicle location specifying system of the fourth embodiment is configured by vehicle location detecting devices MEU1 and MEU2 attached to an elevator cage ELV, a reflecting unit REF including positional markers MK1 to MK4, etc. The vehicle location detecting devices MEU1 and MEU2 are same with the vehicle location detecting device MEU according to the first to third embodiments described above. In addition, the positional markers MK1 to MK4 are same with the positional marker MK according to the above-described first to third embodiments, and each of them is attached to corresponding one floor.

The fourth embodiment can perform a location specification of an elevator with a high precision and a high reliability. Elevators are required to stop at each floor with a high location precision. The current location management of an elevator cage ELV uses a rotary encoder ROT, where the rotary encoder ROT converts a mechanical displacement of a rope suspending the elevator cage ELV into an electrical pulse signal and the number of pulses is counted to detect the location.

However, in recent years, moving velocity of the elevator cage ELV has been made faster and so errors in measurement due to flexure of the rope has been getting larger. Consequently, since the indirect measurement method by the rotary encoder ROT may be unable to specify locations if the rope is cut, a method of directly specifying locations of the elevator cage itself has been desired. Accordingly, it can be expected to realize a higher reliability and higher precision of the location management of the elevator cage ELV by a noncontact location detection device using radiowaves of the present invention.

In the vehicle location specifying system shown in FIG. 14, the vehicle location detecting devices MEU1 and MEU2 are attached on the top and bottom of the elevator cage ELV. While the reflecting unit REF may be newly attached to specify the location of the vehicle, it is also available to use a threshold for elevator called "sill" having been already attached to each floor. Since the sill is a metal protrusion certainly provided to each floor and it is attached with a high location precision, detection of the sill can be utilized for control of stopping position. During uplifting, the vehicle location detecting device MEU1 attached on the top of the elevator cage ELV previews a sill at an upper floor. During lowering the elevator cage ELV, the vehicle location detecting device MEU2 attached on the bottom of the elevator cage ELV previews a sill at a lower floor.

Since no influence of the flexure of the rope like mentioned above, a high-speed movement can be realized without a deceleration until just before a stopping position.

Therefore, according to the vehicle location specifying system of the above-described first to fourth embodiments, the following effects can be obtained.

(1) Installation cost, maintenance cost, etc can be reduced as compared with the location management method currently in the mainstream.

(2) A location detection with a resolution more precise or smaller than or equal to 1 cm is enabled.

(3) A highly reliable location specification not affected by slip and slide of wheels and flexure of the rope is enabled.

In the foregoing, the invention made by the inventors of the present invention has been concretely described based on the embodiments. However, it is needless to say that the present invention is not limited to the foregoing embodiments and various modifications and alterations can be made within the scope of the present invention. Further, the above first to fourth embodiments may be respectively combined suitably.

For example, regarding the installation locations, the methods in the above first to fourth embodiments have described about installing the vehicle location detecting device MEU on the vehicle side and installing the positional markers MK on the fixed vehicle side, but it is not limited to this and an opposite installation method can be considered.

What is claimed is:

1. A detection device mounted on a vehicle for detecting location information of the vehicle, the detection device comprising:
    a radiowave transmitter emitting a first radiowave;
    a radiowave receiver receiving a second radiowave that is a radiowave reflected by hitting against an object; and
    a recognition device detecting the location information of the vehicle based on changes in a radio field strength of the second radiowave.

2. The detection device according to claim 1, wherein the first radiowave is an electromagnetic wave of a millimeter wave band.

3. The detection device according to claim 1, wherein the radiowave receiver includes a rectifier and smoothing circuit, and converts the second radiowave into a DC (Direct Current) signal by the rectifier and smoothing circuit to output the same.

4. The detection device according to claim 1, wherein the recognition device includes a location information table containing installation position information of the object, and compares the changes in radio field strength of the second radiowave and the location information table to detect a position information of the vehicle.

5. The detection device according to claim 1, wherein the recognition device includes a location information table containing installation position information of the object, and refers to the location information table with indexing by a data stream obtained from the changes in the radio field strength of the second radiowave to specify a location of the vehicle.

6. The detection device according to claim 1, wherein the recognition device includes a location information table containing installation position information of the object, and classifies the changes in the radio field strength of the second radiowave into a plurality of radio field strength levels with taking a predetermined threshold as a criterion, counts a number of times the changes in the radio field strength of the second radiowave is classified to a specific radio field strength level, and refers to the location information table with indexing by the counted number to specify a location of the vehicle.

7. The detection device according to claim 1, wherein the object is a plurality of radiowave reflecting materials separately arranged along a track of the vehicle.

8. The detection device according to claim 1, wherein the object is formed by a combination of one or more radiowave reflecting materials and one or more radiowave absorbent materials.

9. The detection device according to claim 8, wherein the object is formed with a combination of shapes of the radiowave reflecting materials and the radiowave absorbent materials different to each other.

10. The detection device according to claim 1, wherein the vehicle is a railroad vehicle or an elevator cage.

11. A railroad vehicle mounting a detection device for detecting location information, wherein the detection device comprises:
a radiowave transmitter emitting a first radiowave;
a radiowave receiver receiving a second radiowave that is a radiowave reflected by hitting against an object; and
a recognition device detecting location information of a vehicle based on changes in a radio field strength of the second radiowave.

12. The railroad vehicle according to claim 11, wherein the first radiowave is an electromagnetic wave of a millimeter wave band.

13. The railroad vehicle according to claim 11, wherein the radiowave receiver includes a rectifier and smoothing circuit, and converts the second radiowave into a DC signal by the rectifier and smoothing circuit to output the same.

14. The railroad vehicle according to claim 11, wherein the recognition device includes a location information table containing installation position information of the object, and compares the changes in the radio field strength of the second radiowave and the location information table to detect a position information of the vehicle.

15. The railroad vehicle according to claim 11, wherein the recognition device includes a location information table containing installation position information of the object, and refers to the location information table with indexing by a data stream obtained from the changes in the radio field strength of the second radiowave to specify a location of the vehicle.

16. The railroad vehicle according to claim 11, wherein the recognition device includes a location information table containing installation position information of the object, and classifies the changes in the radio field strength of the second radiowave into a plurality of radio field strength levels with taking a predetermined threshold as a criterion, counts a number of times the changes in the radio field strength of the second radiowave is classified to a specific radio field strength level, and refers to the location information table with indexing by the counted number to specify a location of the vehicle.

17. The railroad vehicle according to claim 11, wherein the object is a plurality of radiowave reflecting materials separately arranged along a track of the vehicle.

18. The railroad vehicle according to claim 11, wherein the object is formed by a combination of one or more radiowave reflecting materials and one or more radiowave absorbent materials.

19. The railroad vehicle according to claim 18, wherein the object is formed with a combination of shapes of the radiowave reflecting materials and the radiowave absorbent materials different to each other.

* * * * *